United States Patent [19]

Wajc

[11] 4,265,863

[45] May 5, 1981

[54] INTEGRATED PROCESS FOR TREATMENT OF RESIDUAL SOLUTIONS FROM ANODIZATION PLANTS

[75] Inventor: Samuël J. Wajc, Braine L'Alleud, Belgium

[73] Assignee: Exergie Société de Personnes a Responsabilitié Limitée, Brussels, Belgium

[21] Appl. No.: 26,642

[22] Filed: Apr. 3, 1979

[30] Foreign Application Priority Data

May 4, 1978 [FR] France ................. 78 10047

[51] Int. Cl.³ .................... C01F 7/02; C01F 7/74; C01D 5/00
[52] U.S. Cl. ............................. 423/119; 423/127; 423/128; 423/179; 423/199; 204/DIG. 13
[58] Field of Search ........... 423/111, 119, 127, 128, 423/179, 184, 199; 204/DIG. 13

[56] References Cited

U.S. PATENT DOCUMENTS

| | | | |
|---|---|---|---|
| 2,304,519 | 12/1942 | Wilson | 423/556 |
| 2,452,024 | 10/1948 | Wilson | 423/556 |
| 2,989,372 | 6/1961 | Gilbert | 423/627 |
| 3,738,868 | 6/1973 | Lancy . | |
| 3,909,405 | 9/1975 | Aoyama . | |
| 3,953,306 | 4/1976 | Lancy | 423/556 |

*Primary Examiner*—Herbert T. Carter
*Attorney, Agent, or Firm*—Holman & Stern

[57] ABSTRACT

A process and installation for the integrated treatment of concentrated residual solutions resulting from the anodization of aluminium parts is described, in which caustic soda is employed in the pickling process and sulphuric acid in the anodization bath.

The process comprises three sets of operations:

(1) Production of aluminium sulphate in concentrated solution or in hydrated crystals, by the treatment of part of the residual solution from the anodization.
(2) Production of precipitated aluminium hydroxide and a solution of sodium sulphate from residual anodization and pickling solutions.
(3) Production of sodium aluminate from residual pickling solutions and aluminium hydroxide produced in (2). (FIG. 1.)

15 Claims, 3 Drawing Figures

INTEGRATED PROCESS FOR TREATMENT OF RESIDUAL SOLUTIONS FROM ANODIZATION PLANTS

BACKGROUND OF THE INVENTION

1. Field of the Invention

The present invention relates to an integrated process for the treatment of the residual solutions resulting from anodization plants producing aluminium or aluminium alloy parts, where use is made of an aqueous solution of sulphuric acid in the anodization bath and of a lye wash of caustic soda (i.e. NaOH) in the pickling bath, when this latter stage is included in the operation. The invention likewise relates to an installation enabling the process to be carried out.

2. Description of the Prior Art

It is known that anodization, also termed anodic oxidation, is an electrochemical process for the treatment of surfaces of aluminium and its alloys by the formation of protective coatings of variable thickness and texture consisting of oxides of the base metal. The main stages are those of degreasing the parts to be treated, pickling them, anodizing them and then sealing by means of hot water or steam the layer of oxide obtained by anodization. In certain cases, however, e.g. in a surface treatment intended for the production of shiny components of aluminium or aluminium alloy, the pickling is dispensed with. In between the successive bath treatments mentioned, the parts are vigorously rinsed with water.

The composition of the successive baths may vary from one production chain to another, but for numerous applications, particularly for the anodization of matt strips and sections, the pickling is generally effected in an aqueous bath of caustic soda, while the anodization bath is essentially an aqueous solution of sulphuric acid.

It is precisely to the treatment of the residual solutions containing caustic soda (if pickling is effected) and sulphuric acid respectively, in varying proportions, that the present invention relates. One particular variant thereof applies to cases in which no pickling is carried out.

It is well known (cf. S. Wernick and R. Pipper—"The surface treatment and finishing of aluminium and its alloys"—R. Draper, Teddington, Chap.21) that the rinse waters, abundant but diluted, have to be treated separately from the concentrated pickling and anodization solutions, by combining them, adjusting the pH value (e.g. by the addition of caustic soda or of hydrochloric acid), decantation and draining off or possibly, partial recycling. Precipitated aluminium hydroxide is not toxic; it can, therefore, be separated by filtration or some similar means and evacuated to a dumping site.

The concentrated residual water emanating directly from the pickling procedure, if any, and from the anodization must, therefore, be treated independently of the rinse water (cf. S. Wernick and R. Pipper—cited above) and the present invention relates more particularly to the treatment of the concentrated water and to the installations required for this purpose.

The problem can be summarized by assuming, for example, that the output of waste water from pickling contains 50 g/l of caustic soda and 100 g/l of sodium aluminate (as well as traces of the sodium gluconate used as a stabilizing agent for the aluminate) while the output of waste water from the anodization contains, for example, 200 g/l of sulphuric acid and 70 g/l of aluminium sulphate. The amount drawn off from the pickling vat must naturally be kept to a minimum, but must, nevertheless, be sufficient to ensure that the concentration of sodium aluminate in this vat will not exceed the threshold above which an uncontrolled precipitation of aluminium hydroxide will occur. Similarly, the quantity drawn off from the anodization tank must be sufficient to ensure that the concentration of aluminium sulphate will not exceed the threshold beyond which flaws would occur in the layer of oxide obtained by anodization.

Numerous processes have already been proposed, either for the treatment of the waste pickling water by itself or for that of the pickling water and anodization water in one integrated process.

According to Japanese Pat. No. 75-151,929 by Hashimote Hirozaku and Marushima Norio, for instance, the two outputs are mixed with lime, in such a way as to obtain, after precipitation, filtration and reaction at 1200° C., an additive for mortar or cement.

According to Japanese Pat. No. 76-34,563 by Hayashi Toshio, it is possible, by proceeding in stages, to recycle the caustic soda. By mixing the two outputs, the aluminium hydroxide is precipitated and a solution of sodium sulphate formed. Filtration is then effected, thus forming a cake of aluminium hydroxide, which will be eliminated, and a filtrate, to which lime is added. This results in the precipitation of gypsum (eliminated after filtration) and a solution containing most of the caustic soda initially introduced into the bath.

According to Japanese Pat. No. 74-130,907 by Tashire Hiroshi, a sodium aluminate solution is prepared by alternating reactions and filtrations of the two outputs. This solution is subsequently reacted with a cobalt salt or magnesium salt in such a way as to precipitate the corresponding aluminate. After filtration, drying and reaction above 1000° C., a spinel is obtained which can be used in the manufacture of refractories.

According to Japanese Pat. No. 74-107,023 by Tashire Hiroshi, Yamashite Masato and Harada Noboue, the process is confined to the treatment of the waste pickling solution. By the addition of a limewash, a calcium aluminate is precipitated from which an aluminous cement is drawn off by filtration, dried, heated to 1200° C. and crushed. It is clear that the filtrate contains the caustic soda, which as a general principle is capable of being recycled.

Finally, according to Japanese Pat. No. 533,111 by Professor Tajima, the two outputs are treated separately. To the residual pickling solution is added sodium silicate in order to precipitate a double silicate of aluminium and sodium and to regenerate, in principle completely, the initial bath of caustic soda. Furthermore, the aluminium sulphate of the anodization bath is precipitated in the form of ammonium alum or potassium alum by the addition of ammonium sulphate or potassium sulphate. The unconverted sulphuric acid is capable of being recycled.

These various processes suffer from certain drawbacks, particularly from the fact that one or more supplementary reactants have to be purchased in order to effect the reactions, that the saleability of the resulting products is not certain, that when used in industry the recycled outputs may be contaminated by the new products and that the precipitation might continue to take place in the tanks. Furthermore, some of the above methods involve the use of furnaces operating at very high temperatures, which increase both the installation costs and the operating costs.

SUMMARY OF THE INVENTION

An integrated process has now been found for the treatment of the concentrated residual solutions resulting from anodization which enables the aforementioned drawbacks to be avoided and a simple and economical treatment to be applied to the residual solutions emanating from anodization plants of the type described. This provides a saving of costs which result from the regeneration and recycling of some of the reagents and to the recuperation of marketable by-products, at the same time avoiding the pollution caused by aqueous effluents from which the harmful constituents have not been completely removed.

The present invention, therefore, provides an integrated process for the treatment of residual solutions from plants producing anodized parts of aluminium or aluminium alloy, using an aqueous solution of caustic soda in the pickling bath, if any, and an aqueous solution of sulphuric acid in the anodization bath. In this process the treatment of the diluted rinse waters is effected in a known manner, by mixing them together and adjusting the pH value, independently of the treatment of the concentrated residual solutions emanating from the pickling and that emanating from the anodization, said process being characterized by the fact that the treatment of the concentrated residual waters comprises the following sets of operations:

(1) The production of aluminium sulphate in the form of a concentrated solution or in the form of hydrated crystals, by treatment of part of the output of residual anodization solutions by evaporation and crystallization, or by treatment of part of the output of residual anodization solutions with part of the aluminium hydroxide formed in Stage 2 of the operations.

(2) The production of precipitated aluminium hydroxide and a solution of sodium sulphate by treatment of that part of the output of residual anodization solution which was not used in Stage 1, by means of part of the output of residual pickling solution, if the process includes the pickling operation, it being also possible for the reactor employed for this treatment to be fed by recycling part of the aluminium sulphate solution produced in Stage 1 above and/or part of the sodium aluminate solution produced in Stage 3 below.

(3) The production of a sodium aluminate solution by causing that part of the output of residual pickling solution which was not used in Stage 2 to react with that part of the aluminium hydroxide produced in Stage 2 which was not used in Stage 1 above, accompanied or followed by the elimination of a quantity of water such that the sodium aluminate will finally be obtained in the form of concentrated solution, powder or granules.

In a first variant of the process, the treatment of part of the residual anodization solution output in Stage 1 of the operations is thus effected simply by evaporation and crystallization, in such a way as to obtain a concentrated solution of sulphuric acid, which is recycled to the anodization tank, and crystals of hydrated aluminium sulphate, which are then separated.

In a second variant, the treatment of part of the output of residual anodization solution in Stage 1 is effected by reaction with part of the aluminium hydroxide formed in Stage 2, in such a way as to form an aluminium sulphate solution, which is evaporated until a concentrated solution or hydrated crystals are obtained which can be marketed.

If the output of residual anodization water is insufficient, the shortage of acid residual water in the second set of operations is made up by the addition of a corresponding amount of sulphuric acid.

The proportions in which the outputs of residual pickling and anodization water are distributed among the three stages will vary according to the conditions of operation of the anodization plant. In most circumstances, all three stages described above are carried out, but situations may occur in which one set of operations or even two will be omitted.

Thus, if the output of residual anodization solution is insufficient to enable the three sets of operations to be performed, the first may be dispensed with, the shortage of residual anodization solution being compensated for in the second set of operations, by a corresponding quantity of sulphuric acid.

If, as mentioned above, no pickling is carried out, as in surface treatments for the production of glossy aluminium or aluminium alloy components, it goes without saying that Stages 2 and 3 will be omitted, the process being confined to the first set of operations, whereby only evaporation and crystallization occurs.

In another variant of the process, applicable to cases in which concentrated residual pickling solutions and concentrated residual anodization solutions have to be treated, the second set of operations indicated above is omitted and all the residual pickling water is treated in the third set of operations, in which the addition of aluminium hydroxide is replaced by a corresponding addition of metallic aluminium scrap.

In certain stages of the process it is naturally possible to make use of the rinse water, which likewise contains recoverable elements. For example, the aluminium hydroxide produced in the second set of operations can, with advantage, be washed by means of the liquid mud deposited in the decantation basin of the rinse water treatment station, before it is stored with a view to its use in the third set of operations.

It has also been found advantageous to recycle the residual mother-liquor from the sodium sulphate crystallization in the second set of operations to the aluminium hydroxide precipitation reactor included in the same set of operations.

The present invention likewise relates to the installation required for the performance of the process. This installation will now be described in conjunction with a more complete description of the functioning of each of the three sets of operations of which the most general and also the most frequent form of the process consists.

DESCRIPTION OF THE DRAWINGS AND PREFERRED EMBODIMENTS

It has been seen that the purpose of the first set of operations is to recycle the unconverted sulphuric acid present in the residual anodization solution. In this set of operations some of the output of waste anodization solution (which contains, for example, 200 g/l of $H_2SO_4$ and 70 g/l of $Al_3(SO_4)_3$) is treated by evaporation and crystallization, either in a combined evaporator-crystallizer or in two separate units. That part of the output which is thus treated corresponds to the remainder of the quantity required to react, in the second set of operations with residual pickling solution, thus forming the aluminium hydroxide to be used in the third set of operations. The crystalline magma obtained is treated by filtration, decantation, centrifugal decantation or any other suitable liquid-solid separation method. This provides both a hydrated aluminium sulphate, for which there are major outlets in the paper industry and the treatment of waste water, for example, and a concentrated solution of sulphuric acid which has not been contaminated by new reagents and which is thus capable of being recycled to the anodization stage.

As a variant, part of the aluminium hydroxide cake produced in the second stage is dissolved by part of the output of residual anodization solution. The resulting aluminium sulphate solution is evaporated, either moderately, in order to obtain a concentrated solution, or more thoroughly, in order to obtain, by simple cooling, hydrated sulphate in a solid state.

The purpose of the second set of operations is to produce sodium sulphate and aluminium hydroxide. In this set of operations that output of waste solution from anodization which was not used in the first stage, is mixed in a reactor with part of the output of waste pickling solution, in order to enable the following reactions to take place:

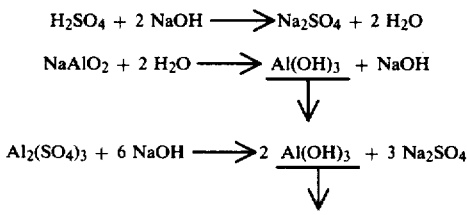

Under neutral conditions everything occurs as if only the first reaction had taken place between the caustic soda and the sulphuric acid which were used at the anodization works, while the aluminium which is temporarily caused to pass into solution during the pickling and anodization is separated by precipitation of aluminium hydroxide during mixing of the two outputs. The mud produced is treated by filtration or by some other suitable method of liquid-solid separation. The solid residue, as we have seen, can be washed by the aid of the liquid mud which has formed in the decantation basin of the rinse water treatment station which is then stored with a view to its use in the third operation and also in the first, if this takes place. The remaining sodium sulphate solution is partially evaporated and crystallized in a single evaporator-crystallizer or in separate units. The crystalline magma obtained is treated by filtration, decantation, centrifugal decantation or any other suitable method for liquid-solid separation. The sodium sulphate decahydrate crystals (Glauber salt) obtained are either conditioned to prevent them from coagulating and then packed for sale or treated by more advanced drying, in such a way as to form dehydrated crystals, which are then packed for sale. There are outlets for these products in the paper industry (kraft pulp), the glass and cement industries, etc. The mother-liquors left after crystallization constitute a drained substance which can be advantageously guided to the reactor in which the precipitation of aluminium hydroxide is effected. Thus the sodium sulphate still present will, in the end, undergo crystallization, while the extraneous ions will be adsorbed by the aluminium hydroxide and finally pass to the third of the sets of operations, and to the first, if this takes place, thus entering the sodium aluminate and aluminium sulphate, respectively, which are produced therein.

The third set of operations is intended to produce sodium aluminate from at least part of the residual pickling solution and the aluminium hydroxide which is obtained in the second set of operations. It is known that the composition of the pickling bath is metastable (cf. Kirk and Othmer—Encyclopaedia of Chemical Technology, 1962, II, p. 7, and Gmelins Handbuch der anorganischen Chemie, publ. by the Verlag Chemie, Berlin, 1934, XXXV, B, p. 360) and that if traces of sodium gluconate were not added in order to chelate the aluminium, the sodium aluminate in solution would decompose in accordance with the following equation:

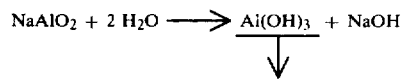

It is obvious, however, that this reaction cannot occur if the water is eliminated from the system. In other words, aluminium hydroxide can be added to the waste pickling solution in order to bring about the reaction of the caustic soda still present, provided the water is eliminated therefrom simultaneously; the reserve reaction to the above will then be used:

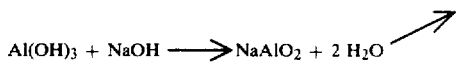

The reaction will proceed, for example, in a continuous mixer reactor serving at the same time as an evaporator. This reactor is fed both with that part of the output of residual pickling solution which was not used in the second set of operations and with the quantity of aluminium hydroxide produced in the same set of operations. There is a very wide choice of operating conditions for the reactor (temperature, pressure, period of dwell). Thus, if the alumimium hydroxide precipitated in the second set of operations is a gel, the operations of causing it to pass into solution at a moderate temperature, purifying it by centrifuging and evaporating it can then be carried out in succession in different units. The resulting sodium aluminate solution is a liquid which is highly viscous at ambient temperature but which can be drawn off from the reactor or evaporator without difficulty when hot. This product can be placed as it is in barrels for sale or else possibly dehydrated in a suitable drying apparatus and conditioned (e.g. by crushing and screening or by drying by pulverization) for sale in the form of granules or powder. There is a particularly advantageous outlet for the sodium aluminate in paper mills and water treatment stations.

It has already been seen that, if necessary, sodium aluminate can be formed in the reactor-evaporator by adding aluminium scrap to the residual pickling water, in such a way as to set up the reaction

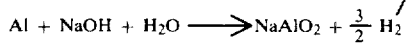

This variant enables the construction of the second unit of equipment to be dispensed with (i.e. the apparatus for the production of aluminium hydroxide) but is only of advantage insofar as this conversion of the aluminium to aluminate is more profitable than the recycling of the aluminium scrap to the foundries.

It goes without saying that the usual energy-saving techniques are advantageously applied during the performance of the process. It is possible, for example, to utilize the steam produced in the third stage in order to feed the evaporators of the other two, then operating at a reduced pressure. Similarly, the condensates will be advantageously used for the heating of the building accommodating the installation described here.

The invention will be described in greater detail by reference to the accompanying drawings and by the aid of examples for its application provided by way of illustration.

Figure 1:
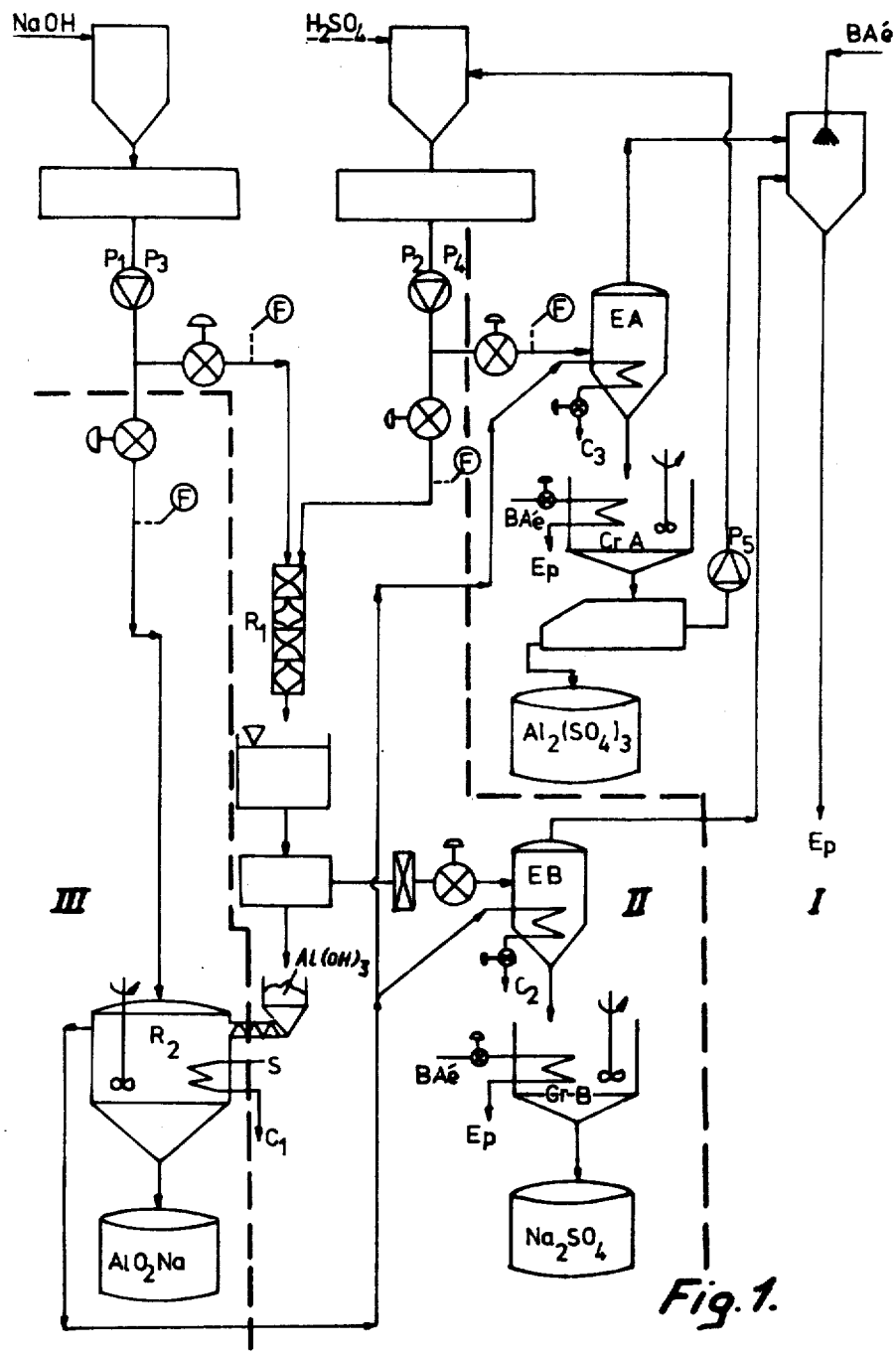
FIG. 1 is a general diagram of the complete process to which the invention relates, thus comprising the three operating assemblies and also indicating the apparatus which can be employed, by way of example, for the performance of this process.

In FIG. 1 three operating assemblies are shown, separated by broken lines and marked I, II and III, respectively. The first assembly, marked I, comprises the operation of conveying some of the residual anodization solution, via the pump $P_2$ (or the reserve pump $P_4$), to an evaporator EA, possibly under a partial vacuum and heated by indirect heating provided by the steam produced in the third operating assembly III (the steam then passing to the condenser $C_3$).

The concentrated solution obtained in the evaporator EA is cooled in the crystallizer CrA, and the aluminium sulphate crystals ($Al_2(SO_4)_3$) thus formed are separated in a centrifugal decanter and possibly conditioned for sale, while the residual liquid, which consists of sulphuric acid, is recycled by the pump $P_5$ to the acid tank preceding the anodization station or to the anodization tank.

The steam formed in the evaporator EA passes into an enclosure in which it is condensed in a vacuum in direct contact with the cooling water coming from BAé.

The crystallizer is likewise cooled by water coming from an aeration basin BAé.

The second operating assembly, marked II, comprises the reaction of the remainder of the residual anodization solution, not used in the first assembly I, with part of the residual pickling solution. These solutions, passing through the pumps $P_2$ (or $P_4$) and $P_1$ (or the reserve pump $P_3$), are conveyed to a reactor $R_1$ (which may, for example, be a static mixer) in which they react together, forming a suspension of $Al(OH)_3$, which is buffered and filtered. The solid thus separated ($Al(OH)_3$) is stored in a storage hopper, while the filtrate passes into an evaporator EB at reduced pressure, heated by a coil in which the steam produced in the third operating assembly circulates, and then to a crystallizer CrB, from which crystallized sodium sulphate, which can be placed in barrels for sale, is collected. The steam formed in the evaporator EB is treated with that of the evaporator EA. The mother-liquors left over from the crystallization can be guided towards the reactor R1 for the precipitation of aluminium hydroxide (recycling not shown in the diagram).

The third operating assembly, marked III, comprises the reaction of the remainder of the residual pickling water, not used in the second assembly, with the aluminium hydroxide produced in this latter and conveyed from the storage hopper, e.g. by an Archimedean screw, to a reactor $R_2$, under pressure, and brought to a high temperature, by a coil S, in order to produce steam (used for the evaporators EA and EB) and a concentrated solution of sodium aluminate ($NaAlO_2$), which can be converted into powder or granules.

After use, the cooling water and the condensates $C_1, C_2$ and $C_3$ returned to an intermediate tank (Ep), and an air cooling system enables the cooling water to be recycled from Ep to BAe.

In the diagram shown in FIG. 1 the symbol F relates to flow meters which enable the circulation of the substances concerned in the process to be measured and thus regulated.

Figure 3:
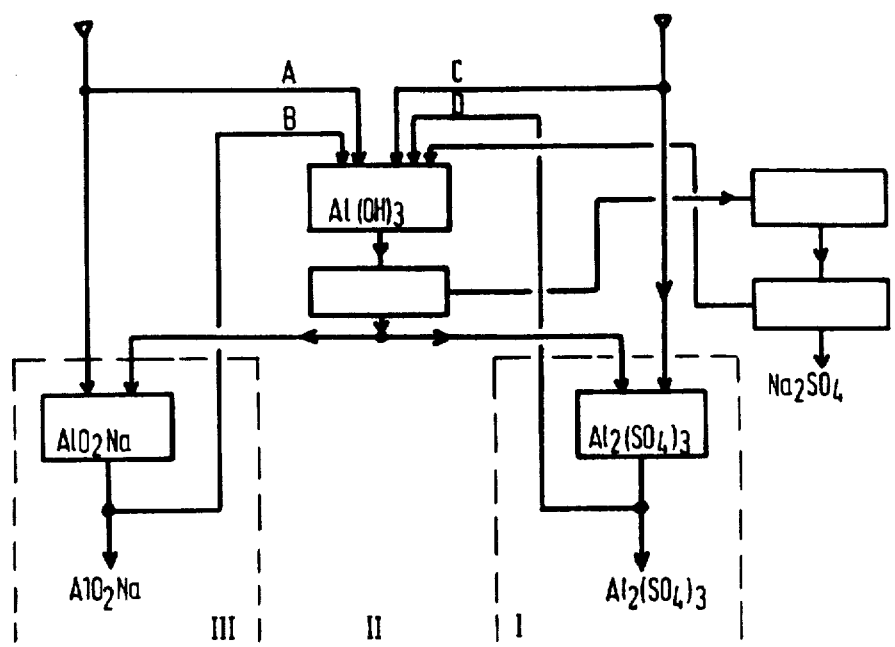
FIG. 3 is a general diagram of the four possible operating variants covered by the invention.

The products formed in the complete integrated installation shown in FIG. 1 thus consist of sulphuric acid (recycled to the anodization), aluminium sulphate, sodium sulphate and sodium aluminate. FIG. 3 is a general diagram of the four variants possible when assembly I described above is replaced by an installation for the production of $Al_2(SO_4)_3$ by reaction: the output feeding the $Al(OH)_3$ reactor with basic solution is either A or B, while the acid solution is either C or D. In this case no recycling of sulphuric acid takes place. The choice of the variant will be governed by secondary considerations, such as the type of hydroxide which it is desired to precipitate and the desire to save energy for the entire installation. The same variants are applicable to the circumstances represented by FIG. 1. The items of apparatus indicated in this FIG. 1 only constitute functional examples and can naturally be replaced by technical equivalents known per se without thereby departing from the scope of the present invention.

The following examples, given by way of illustration but without any limitation thereon, show the conditions of operation and performance of the process.

EXAMPLE 1

This example concerns the first set of operations covered by the process to which the invention relates.

Figure 2:
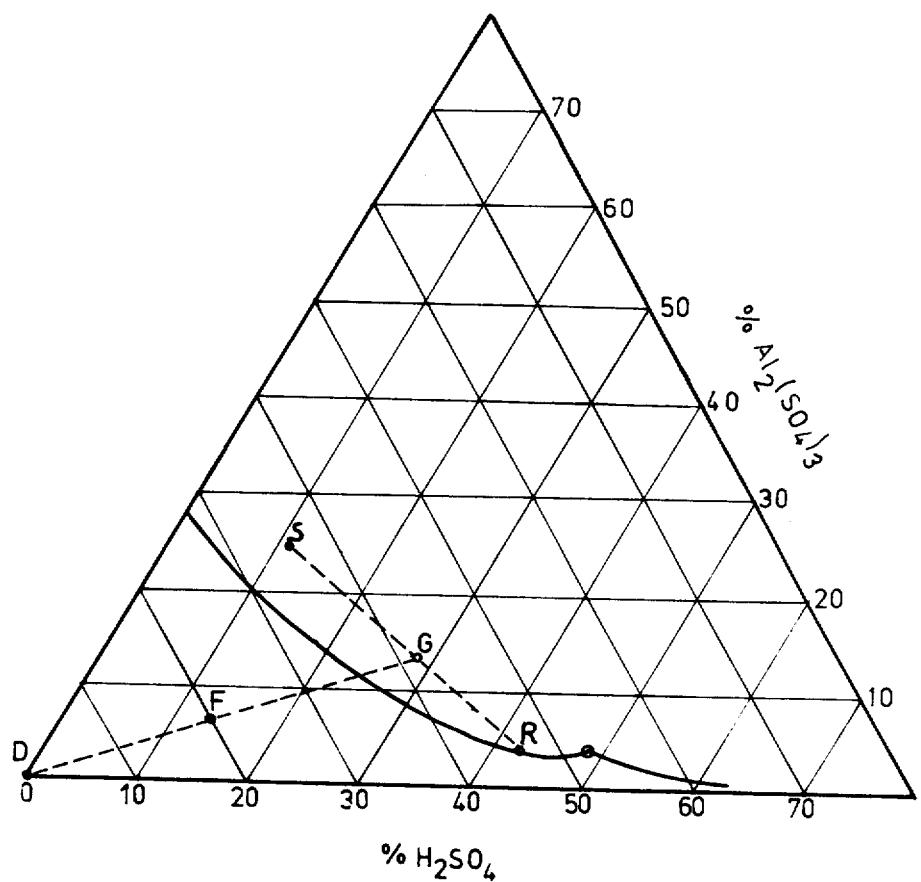
FIG. 2 is a triangular diagram of the system $H_2SO_4$—$Al_2(SO_4)_3$—$H_2O$, giving the composition of the residual anodization water used in Example 1 and showing the composition of the products formed in the course of the treatment of this water in the first set of operations of which the process covered by the invention consists (see Ex. 1 hereinafter).

A specimen amounting to 16 liters of waste water from anodization (specific gravity 1.19, point F in the triangular diagram of the accompanying FIG. 2, in which the percentages are expressed as percentages by weight) was first of all subjected to partial evaporation by means of atmospheric pressure, pure steam having thus been separated at D and a concentrated hot solution at G. By cooling to 20° C. the phases R (solution with 43% by weight of sulphuric acid) and S (aluminium sulphate filtration cake) were separated. It will be noted that S is still contaminated with interstitial sulphuric acid which, when used industrially, can be partly recovered by washing the cake with a saturated solution of aluminium sulphate. Even apart from this it will be noted that 83% of the free sulphuric acid in F is recovered in R, while 86.8% of the aluminium sulphate present has been extracted from F.

EXAMPLE 2

This example relates to the second set of operations covered by the process to which the invention relates.

A specimen of 5 liters of waste pickling solution (specific gravity 1.10) was mixed with 3.32 liters of waste anodization-solution (specific gravity 1.19). The resulting mud had a pH value of 7. After filtration in a vacuum, 7 liters of solution of sodium sulphate were obtained (specific gravity 1.10, 120 g/l) and evaporated at atmospheric pressure, down to one third of their initial volume. The hot concentrated solution was re-cooled. The separation of the Glauber salt commenced at about 28° C., while at about 15° C. the weight of separated Glauber salt was 1.52 kg (of which 0.67 kg consisted of sodium sulphate).

Furthermore, the cake obtained (after rinsing with water) weighed about 850 g, of which 550 g consisted of aluminium hydroxide and 300 g consisted of water.

EXAMPLE 3

This example relates to the third set of operations included in the process covered by the invention.

At atmospheric pressure and at boiling point, a specimen of 2 liters of waste pickling solution dissolves 390 g of aluminium hydroxide mud of 50% by weight (the addition of aluminium hydroxide being progressive). A concentrated solution of sodium aluminate containing 450 g of aluminate was thus obtained. The addition of small quantities of this solution (e.g. 250 ppm) to the waste solution causes a voluminous precipitate of aluminium hydroxide to form (decomposition of the aluminate in the presence of a surplus of water) to the surface of which the impurities of the water are adsorbed.

EXAMPLE 4

This example relates to an illustration of a general case of the integration of the three sets of operations described in Ex. 1, 2 and 3 respectively, the output of anodization water in this example being greater than that required for the production of aluminium hydroxide in the second operating assembly. This example of integration is shown by the schematic manufacturing diagram in FIG. 1.

The output of waste pickling water amounts to 2 $m^3/h$, its main characteristics being: specific gravity 1.10, NaOH concentration 50 g/l, $AlO_2Na$ concentration 100 g/l. This corresponds to an initial NaOH concentration of 98.8 g/l during the pickling.

The output of waste anodization water is 0.6 $m^3/h$, its main characteristics being: specific gravity 1.19, $H_2SO_4$ concentration 200 g/l, $Al_2(SO_4)_3$ concentration 70 g/l. This corresponds to an initial $H_2SO_4$ concentration of 260.2 g/l in the anodization bath.

It can easily be calculated that the outputs of anodization water guided towards the first assembly and towards the second assembly are 0.16 $m^3/h$ and 0.44 $m^3/h$ respectively, while the outputs of pickling water guided towards the second assembly and towards the third assembly respectively amount to 0.94 $m^3/h$ and 1.06 $m^3/h$, respectively. The first assembly will thus produce about 90 kg of steam per hour, 32 kg of $H_2CO_4/h$ (in solution and with 43% by weight) and 11.2 kg of $Al_2(SO_4)_3/h$ (e.g. in the form of $Al_2(SO_4)_3.18 H_2O$ or of a salt containing a greater or smaller proportion of crystallization water). The second assembly will produce about 465 kg of steam per hour, 103.3 kg of $Al(OH)_3/h$ in the form of moist cake) and 164.9 kg of $Na_2SO_4/h$ (e.g. in the form of $Na_2SO_4.10H_2$) or of a less hydrated salt). The third assembly will produce about 1000 kg of steam per hour and 214.7 kg of $NaAlO_2/h$ (in the form of concentrated solution or in the form of granules or powder).

EXAMPLE 5

This example illustrates the steps to be taken when the output of anodization water is very limited.

Let us assume that the composition of the outputs to be treated is the same as in Ex. 4. If the output of waste pickling solution happens to be the same as in the previous case (Ex. 4) but the output of anodization water is between 0.44 and 0.076 $m^3/h$, the acid deficit of the second assembly will have to be compensated by adding sulphuric acid.

Thus, if the output of waste water from anodization amounts to 0.3 $m^3/h$, it will be conveyed at the rate of 0.012 $m^3/h$ to the first assembly and at the rate of 0.288 $m^3/h$ to the second. The said second assembly will also be provided with 41.2 kg/h of sulphuric acid and 0.96 $m^3/h$ of pickling water. The third assembly would treat 1.04 $m^3/h$ of pickling water and 101.4 kg/h of aluminium hydroxide. It will be noted that these operations likewise are accompanied by the production of aluminium sulphate (in a very small quantity), sodium sulphate and sodium aluminate.

EXAMPLE 6

This example illustrates the particular case in which the output of waste anodization solution is very small.

If the output of anodization water is less than 0.076 $m^3/h$, the first operating assembly serves no purpose and a considerable output of sulphuric acid has to be added in the second.

Thus, if the output of waste pickling water is 2 $m^3/h$ and the output of waste anodization water is 0.03 $m^3/h$, this latter output, with the addition of 114.3 kg/h of sulphuric acid, will neutralize 1.01 $m^3/h$ of pickling water in the second assembly. An output of pickling water of 0.99 $m^3/h$ will react, in the third assembly, with 97 kg/h of aluminium hydroxide. In this case, the recuperation plant only produces sodium sulphate and sodium aluminate.

EXAMPLE 7

This example illustrates the case in which the output of pickling water is pil, e.g. in the surface treatment for the production of glossy components.

In this case, only the first operating assembly is required. Thus, if the output of anodization water is 0.6 $m^3/h$, its treatment in the first assembly will result in the production of about 340 kg of steam per hour, 120 kg of $H_2SO_4/h$ and 42 kg of $Al_2(SO_4)_3/h$.

EXAMPLE 8

This example relates to the first operating assembly included in the process covered by the invention.

A specimen of 1 liter of waste water from anodization, containing 200 g of $H_2SO_4$ and 70 g of $Al_2(SO_4)_3$, completely dissolves, at 60° C., a cake of 424 g containing 318 g of water and 106 g of $Al(OH)_3$ in the form of fresh gel.

The numerical data given in Ex. 1–8 must be regarded as illustrations of the process when operating under ideal conditions. It is obvious that all the units of apparatus of which the operating assemblies consist (reactors, crystallizers, evaporators, filters, etc.), whether operating intermittently, semi-continuously or continuously, must be designed to ensure that the reactions and unitary operations indicated will be accompanied by a high rate of output. For each operation, furthermore, steps must be taken to ensure that the bath does not contain any organic or mineral additives which have not been mentioned in the foregoing and which would be liable to alter the course taken by the operations so fundamentally as to render the present process unsuitable.

I claim:

1. An integrated process for the treatment of residual solutions resulting from an anodization treatment of aluminum or aluminum alloy objects, using an aqueous solution of caustic soda in a pickling treatment and an aqueous solution of sulphuric acid in an anodization treatment wherein treatment of the residual solutions comprises the operational stages:
   (a) producing aluminum sulphate by the evaporation of a portion of the residual anodization solution to produce aluminum sulphate in the form of a concentrated solution or crystals;
   (b) producing precipitated aluminum hydroxide and a solution of sodium sulphate by treatment of the portion of residual anodization solution not used in operational stage (a) with a portion of the residual pickling solution;
   (c) producing sodium aluminate by treatment of the portion of the residual pickling solution not used in operational stage (b) with a portion of the aluminum hydroxide produced in operational stage (b) and concurrent or subsequent evaporation of the resulting solution of sodium aluminate to produce sodium aluminate in the form of a concentrated solution, a powder or granules.

2. A process in accordance with claim 1, wherein the sodium sulphate solution produced in operational stage (b) is evaporated to produce crystals of sodium sulphate and a mother liquor, said mother liquor being recycled to operational stage (b).

3. An integrated process for the treatment of residual solutions resulting from an anodization treatment of aluminum or aluminum alloy objects, using an aqueous solution of caustic soda in a pickling treatment and an aqueous solution of sulphuric acid in an anodization treatment wherein treatment of the residual solutions comprises the operational stages:
   (a) producing aluminum sulphate in the form of a concentrated solution or crystals by treatment of a portion of the residual anodization solution with a portion of the aluminum hydroxide formed in operational stage (b);
   (b) producing precipitated aluminum hydroxide and a solution of sodium sulphate by treatment of the portion of residual anodization solution not used in operational stage (a) with a portion of the residual pickling solution;
   (c) producing sodium aluminate by treatment of the portion of the residual pickling solution not used in operational stage (b), with a portion of the aluminum hydroxide produced in operational stage (b) and concurrent or subsequent evaporation of the resulting solution of sodium aluminate to form sodium aluminate in the form of a concentrated solution, a powder or granules.

4. A process in accordance with claim 3, wherein the aluminum hydroxide produced in operational stage (b) is washed with a liquid mud formed in a decantation basin of a rinse water treatment station prior to being stored for use in operational stage (a).

5. A process in accordance with claim 14, whereinn the sodium sulphate solution produced in operational stage (b) is evaporated to produce crystals of sodium sulphate and a mother liquor, said mother liquor being recycled to operational stage (b).

6. A process in accordance with claim 3, wherein the aluminum hydroxide produced in operational stage (b) is washed with a liquid mud formed in a decantation basin of a rinse water treatment station prior to being stored for use in operational stage (c).

7. A process in accordance with claim 6, wherein the sodium sulphate solution produced in operational stage (b) is evaporated to produce crystals of sodium sulphate and a mother liquor, said mother liquor being recycled to operational stage (b).

8. A process in accordance with claim 3, wherein the sodium sulphate solution produced in operational stage (b) is evaporated to produce crystals of sodium sulphate and a mother liquor, said mother liquor being recycled to operational stage (b).

9. An integrated process for the treatment of residual solutions resulting from an anodization treatment of aluminum or aluminum alloy objects, using an aqueous solution of caustic soda in a pickling treatment and an aqueous solution of sulphuric acid in an anodization treatment wherein treatment of residual solutions comprises the operational stages:
   (a) producing precipitated aluminum hydroxide and a solution of sodium sulphate by treatment of the residual anodization solution with a portion of the residual pickling solution and sulfuric acid, and
   (b) producing sodium aluminate by treatment of the portion of the residual pickling solution not used in operational stage (a) with a portion of the aluminum hydroxide produced in operational stage (a) and concurrent or subsequent evaporation of the resulting solution of sodium aluminate to produce sodium aluminate in the form of a concentrated solution, a powder or granules.

10. A process in accordance with claim 9, wherein the sodium sulphate solution produced in operational stage (a) is evaporated to produce crystals of sodium sulphate and a mother liquor, said mother liquor being recycled to operational stage (a).

11. The process of claim 9, wherein a portion of the sodium aluminate produced in step (b) is cycled to operational step (a).

12. The integrated process of claims 9, 10, 4, 6, 2, 8, 5 or 7, wherein a portion of the aluminum sulphate produced in operational stage (a) is cycled to operational stage (b).

13. The integrated process of claims 9, 10, 4, 6, 2, 8, 5 or 7, wherein a portion of the sodium aluminate produced in operational stage (c) is cycled to operational stage (b).

14. The integrated process of claims 9, 10, 4, 6, 2, 8, 5 or 7, wherein a portion of the aluminum sulphate produced in operational stage (a) and a portion of the sodium aluminate produced in operational stage (c) are recycled to operational stage (b).

15. A process in accordance with claims 1, 3, 4, 6, 2 or 9, wherein when the quantity of residual anodization solution is insufficient to provide the required acid concentration in operational stage (b), an amount of sulphuric acid is added in operational stage (b) equivalent to the deficiency of said acid from said residual anodization solution.

* * * * *